United States Patent
Martin et al.

(10) Patent No.: US 6,666,940 B2
(45) Date of Patent: Dec. 23, 2003

(54) MANUFACTURE OF A STRIP BY EXTRUSION OF A TUBE THEN FLATTENING THE TUBE

(75) Inventors: Remy Martin, St-Saturnin (FR); Olivier Dailliez, Chamalières (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 280 days.

(21) Appl. No.: 09/978,451

(22) Filed: Oct. 17, 2001

(65) Prior Publication Data

US 2002/0053389 A1 May 9, 2002

(30) Foreign Application Priority Data

Oct. 18, 2000 (FR) .............................. 00 13424

(51) Int. Cl.[7] .................. B29D 30/00; B29D 30/08; B29D 30/14; B29D 30/28; B29D 30/52
(52) U.S. Cl. .................. 156/117; 156/123; 156/130; 156/244.13; 156/397
(58) Field of Search .............................. 156/110.1, 123, 156/117, 130, 244.13, 244.14, 244.15, 397, 500, 406.4, 394.1; 264/167, 171.12, 209.3

(56) References Cited

U.S. PATENT DOCUMENTS

| | | | |
|---|---|---|---|
| 3,268,380 A | 8/1966 | Guichon et al. | |
| 3,843,482 A | 10/1974 | Wireman et al. | |
| 4,283,241 A | * 8/1981 | Hollmann | ................ 156/117 |
| 4,963,207 A | 10/1990 | Laurent | |
| 5,171,394 A | 12/1992 | Laurent | |
| 5,221,406 A | 6/1993 | Laurent | |
| 5,655,891 A | 8/1997 | Deal et al. | |
| 5,837,077 A | * 11/1998 | Kabe et al. | ............. 156/117 X |

FOREIGN PATENT DOCUMENTS

| | | | |
|---|---|---|---|
| GB | 825897 | 12/1959 | |
| GB | 903794 | 8/1962 | |
| GB | 2050933 | 1/1981 | |
| JP | 02179729 A | * 7/1990 | ................ 156/123 |
| JP | 10217353 A | * 8/1998 | |

OTHER PUBLICATIONS

International Search Report from EP/01125769.

International Search Report from FR/0014674.

\* cited by examiner

*Primary Examiner*—Adrienne C. Johnstone
(74) *Attorney, Agent, or Firm*—Baker Botts L.L.P.

(57) ABSTRACT

A process and apparatus for laying a strip for the manufacture of a tire by extruding uncured rubber through a die to form a rubber tube on a rotary support and flattening the tubular form to form a band which is adhered to a receiving surface on the rotary support.

10 Claims, 7 Drawing Sheets

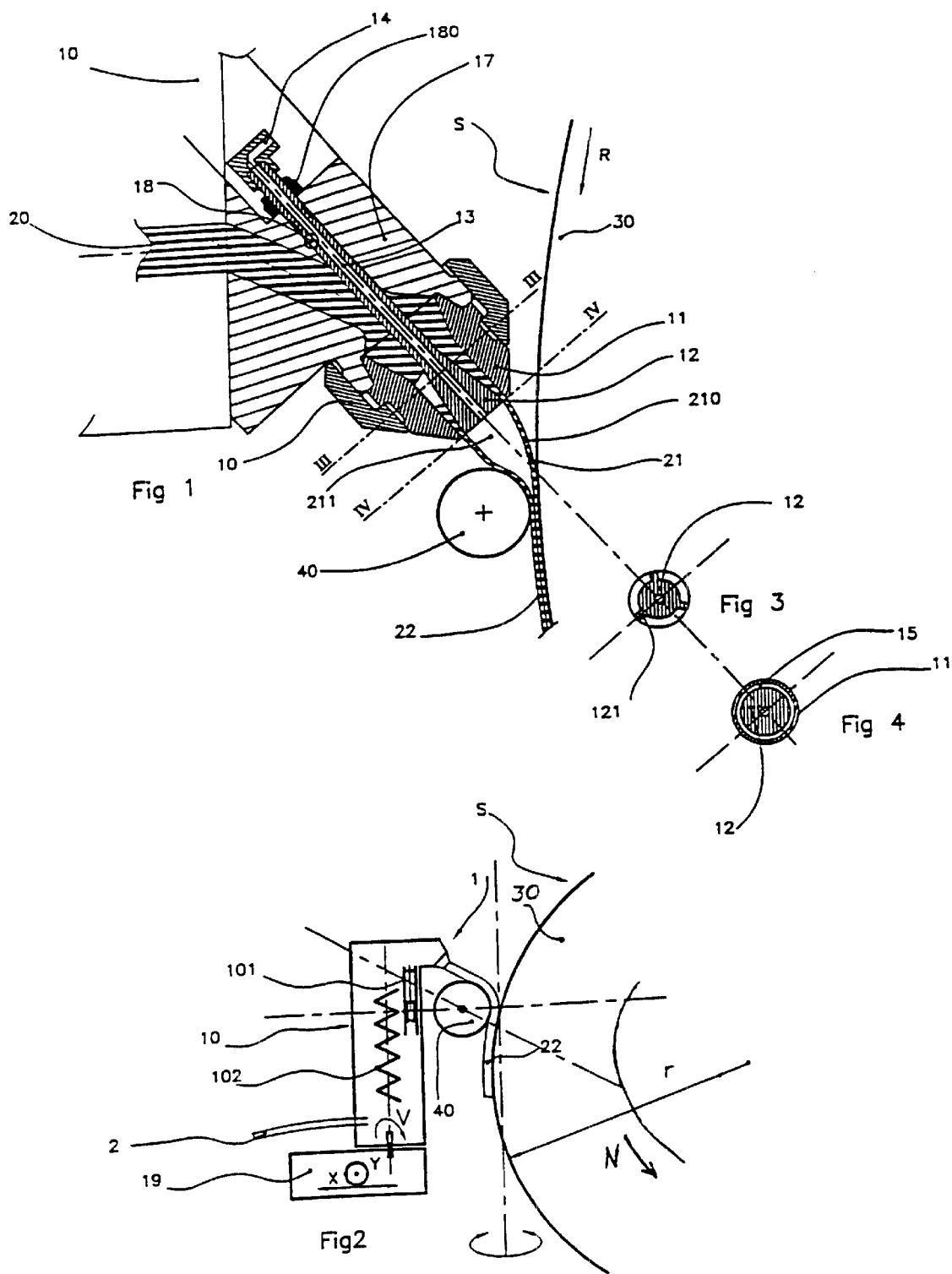

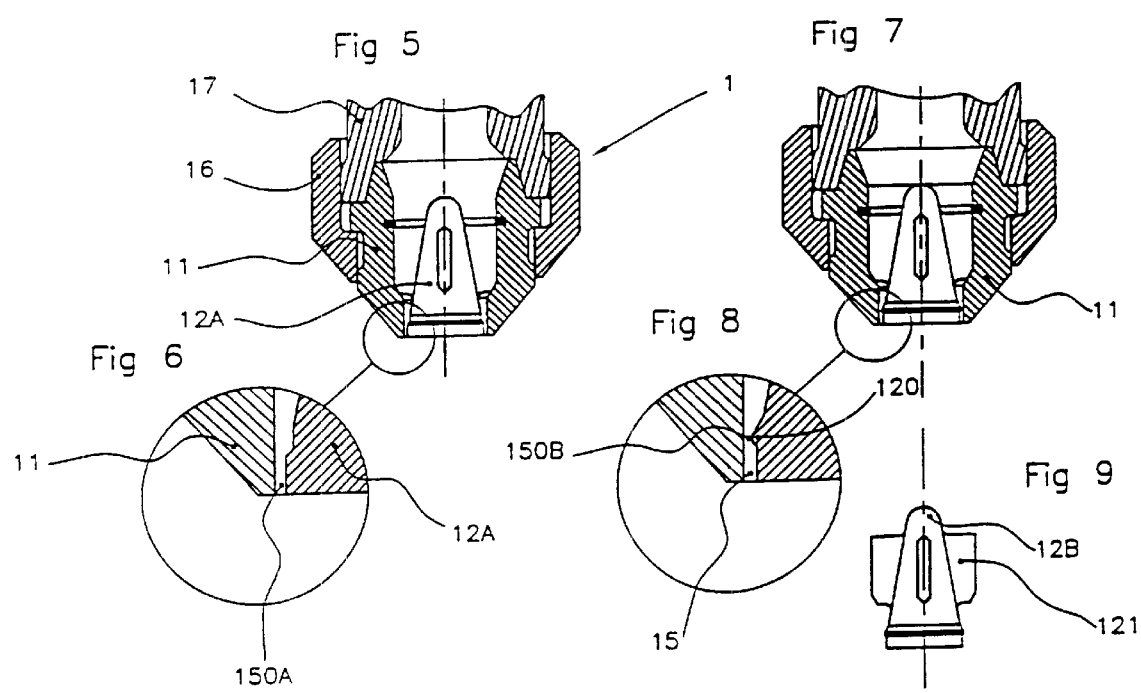

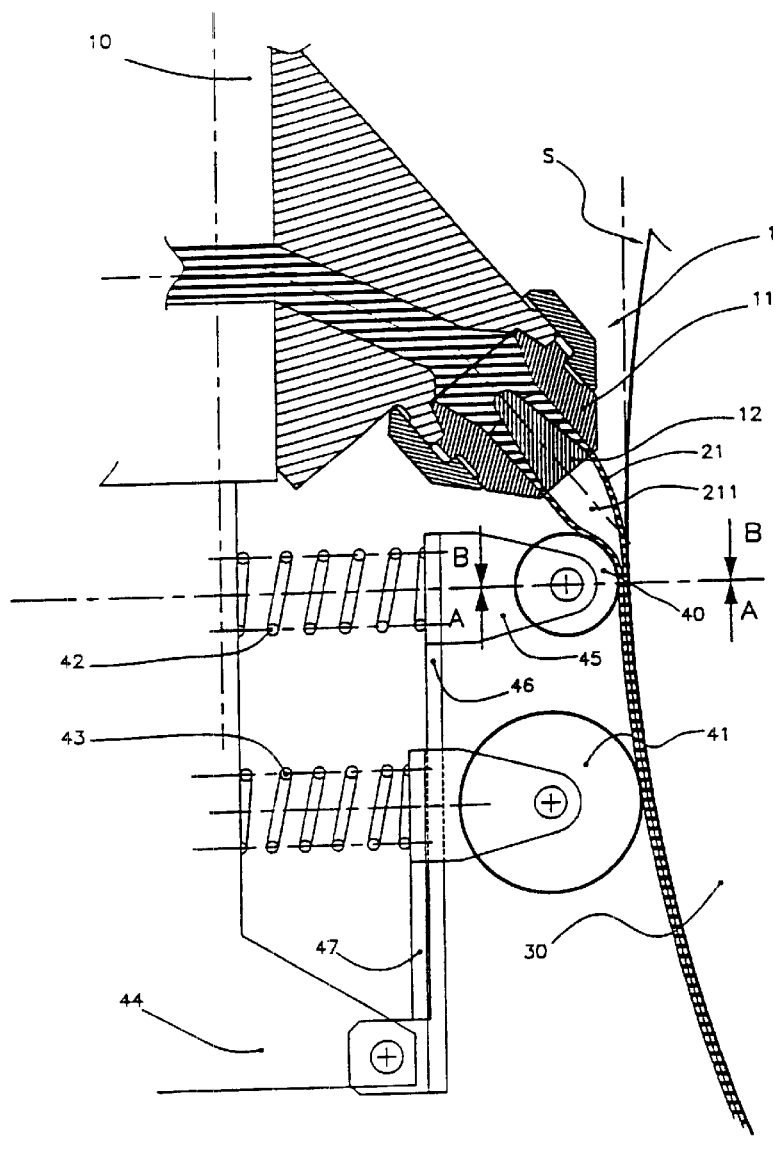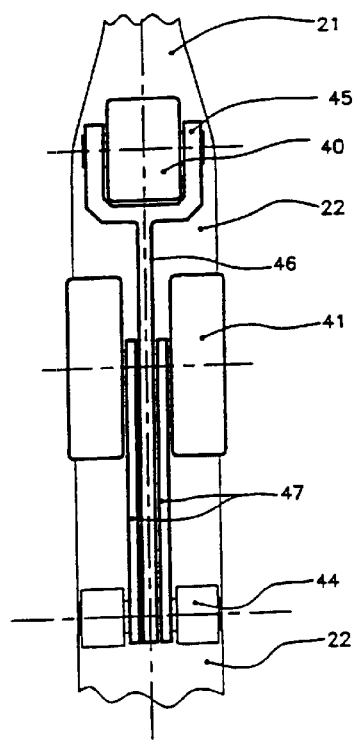
Fig 10
Fig 11

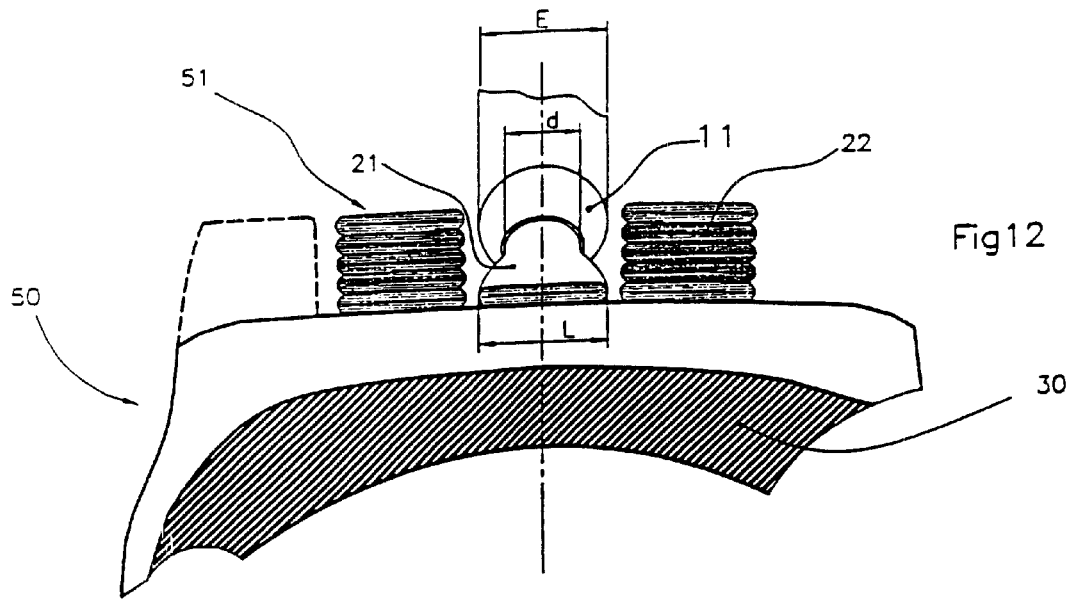
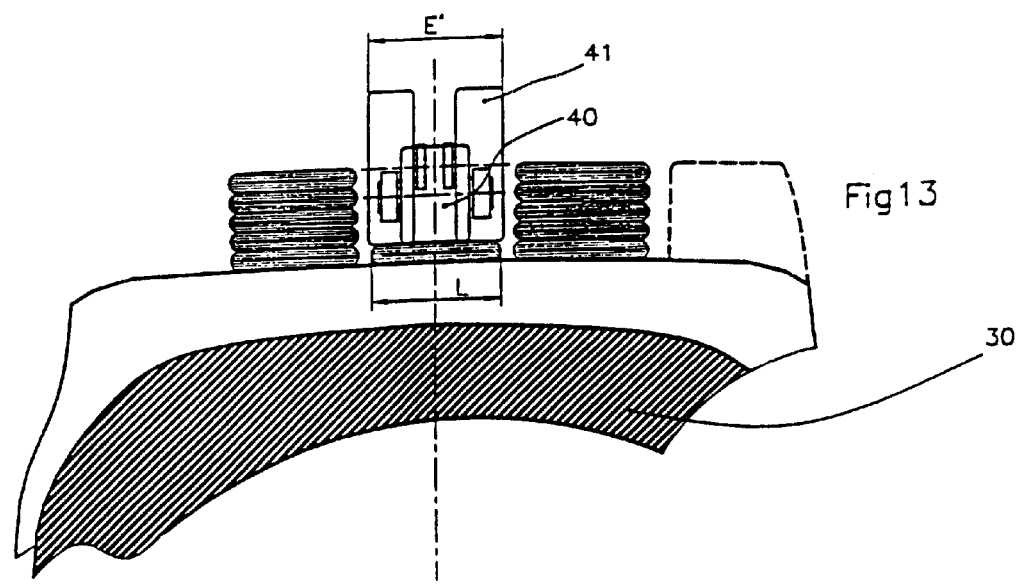

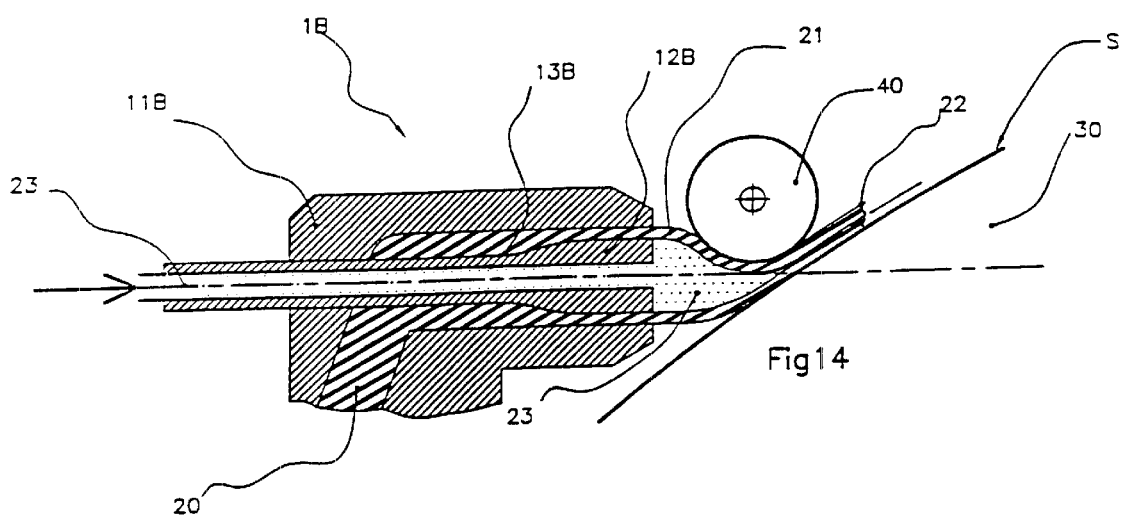

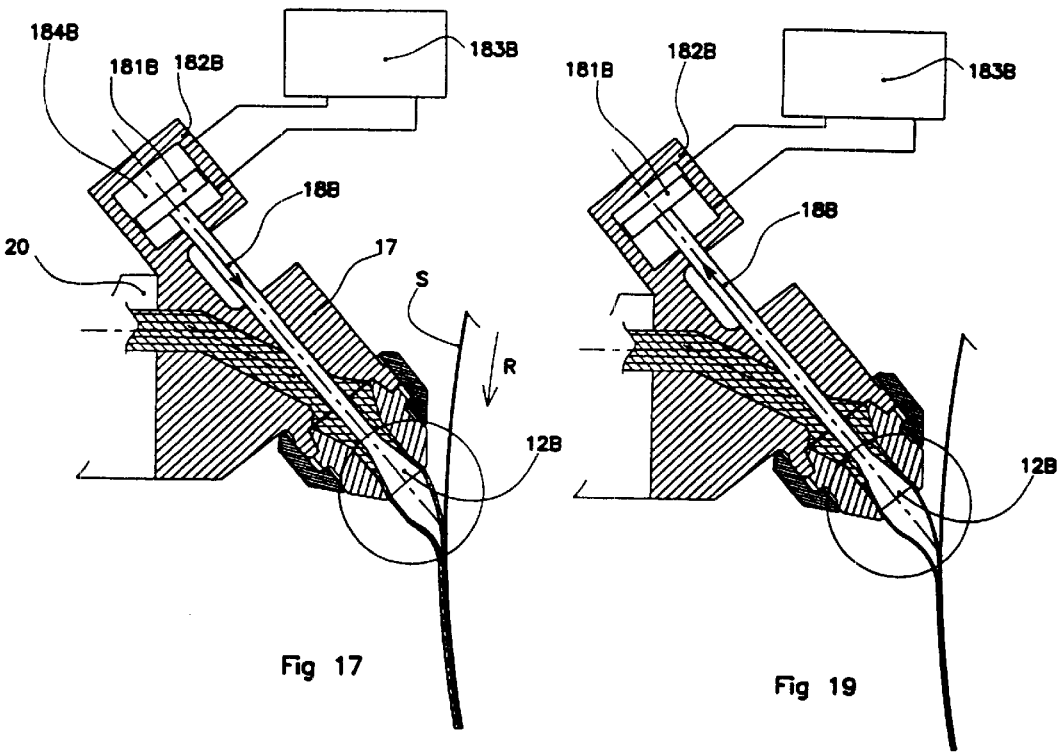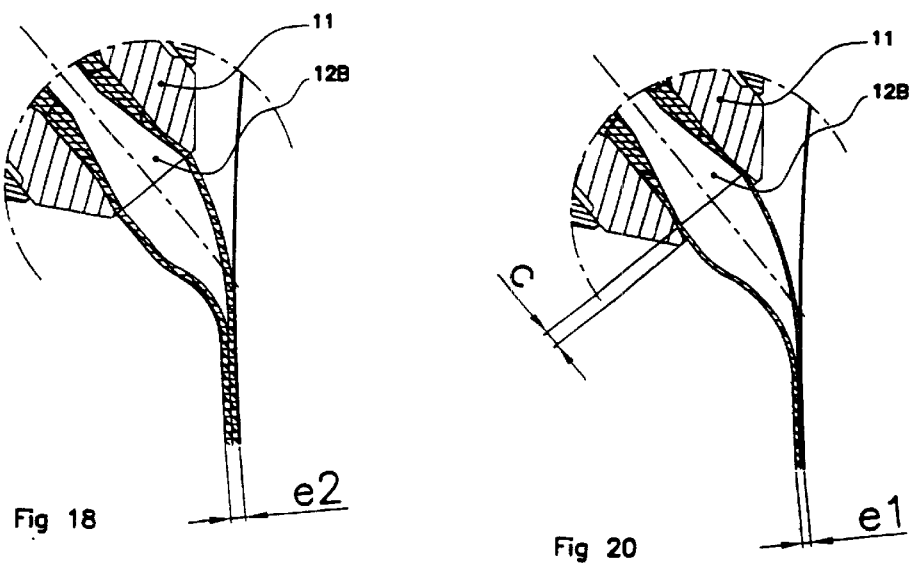

US 6,666,940 B2

MANUFACTURE OF A STRIP BY EXTRUSION OF A TUBE THEN FLATTENING THE TUBE

BACKGROUND OF THE INVENTION

The present invention relates to the laying of rubber products for the manufacture of tires. More precisely, the present invention relates to the manufacture of a tire by winding strips and it relates to the manufacture of semi-finished products in the form of strips.

It is already known that, in order to manufacture a tire of uncured rubber, the laying of all or part of the rubber products may be effected by winding a strip on a manufacturing support. For example, patent application EP 0 264 600 proposes using extrusion of the volumetric type for laying the rubber products with great accuracy. Patent application EP 0 690 229 proposes a volumetric pump used for continuously extruding a strip of uncured rubber with great accuracy.

One well-known problem in the tire industry is that some sulfur-vulcanizable rubber mixes are quite difficult to extrude: the mix has a tendency to crumble, and does not have a smooth surface downstream of the extrusion but rather a granular, bumpy, rough surface which sometimes contains incipient tears. It is difficult to impart an exact, regular form such as a strip to such mixes. This involves difficulties in handling the extruded semi-finished products. This also involves difficulties in laying such products on a raw tire blank during manufacture because the adhesion of such mixes in the uncured state is generally poor.

This is particularly difficult in the technique of winding a strip on a support because, in this case, the extruded rubber sections are quite weak and it is important to be able to extrude strips at high speed in order to be able to lay the necessary volumes of rubber within a suitable time. Now, generally, for a given mix formulation, the more the rate of extrusion and/or of winding on a support is increased, the more the difficulties increase.

SUMMARY OF THE INVENTION

The invention proposes forming a strip by first manufacturing a tube which is subsequently flattened.

A first aspect of the invention relates to the laying of a component comprising uncured rubber during the manufacture of a tire, the laying being effected by winding a band on a rotary support having a receiving surface, by a process comprising the following stages:
  extruding uncured rubber through a die imparting a tubular section to the extruded uncured rubber to form a rubber tube, the wall of which defines an internal cavity,
  flattening the tubular form and thus obtaining a band which is adhered to said receiving surface.

A second aspect of the invention relates to the manufacture of a band of uncured rubber, with addition of a component to the band downstream of an extrusion operation. This may consist of adding fibers. It may consist of adding an additive, in particular a material capable of migrating into uncured rubber. The process comprises the following stages:
  extruding uncured rubber through a die imparting a tubular section to the extruded uncured rubber to form a tube of uncured rubber, the wall of which defines an internal cavity,
  concomitantly with the extrusion, introducing a material into said tube, in a predefined amount,
  flattening the tubular form and thus obtaining a band.

In the examples described below, a rubber tube is extruded using a cylindrical die containing an ovoid which is also cylindrical and of slightly smaller size so as to leave an air gap of revolution between the nozzle and the ovoid. It goes without saying that the cylindrical shape is not limitative, and other forms may be considered, in particular an oval section. The form of revolution is however advantageous for machining parts.

In what follows, different possible applications of the invention are described, in non-limitative manner, which makes it possible to understand the entire scope and all the advantages thereof.

DESCRIPTION OF THE DRAWINGS

FIG. 1 is a section showing an extrusion head equipped with a die for a first application of the invention.

FIG. 2 shows a diagram of an extrusion machine in cooperation with a rotary core acting as a manufacturing reference for a tire, illustrating the first application of the invention.

FIG. 3 is a partial section along III—III of FIG. 1.

FIG. 4 is a partial section along IV—IV of FIG. 1.

FIG. 5 is a partial section through a section plane containing the central axis of a die of revolution, showing a variant embodiment of a die in the first application of the invention.

FIG. 6 is an enlargement of part of FIG. 5.

FIG. 7 is a partial section through a section plane containing the central axis of a die of revolution, showing another variant embodiment of a die in the first application of the invention.

FIG. 8 is an enlargement of part of FIG. 7.

FIG. 9 shows the ovoid of FIG. 7, in isolation.

FIG. 10 shows means used for pressing a strip against the receiving surface, in the first application of the invention.

FIG. 11 is a left-hand view of the variant embodiment illustrated in FIG. 10, some details being omitted.

FIG. 12 is a partial view along AA in FIG. 10.

FIG. 13 is a partial view along BB in FIG. 10.

FIG. 14 shows a second application of a die according to the invention.

FIG. 17 shows another variant embodiment of a die, which can be used equally well in the first application and in the second application of the invention.

FIG. 18 is an enlargement of part of FIG. 17.

FIG. 19 shows another variant in a different adjustment.

FIG. 20 is an enlargement of part of FIG. 19.

DESCRIPTION OF PREFERRED EMBODIMENTS

Figure 15:
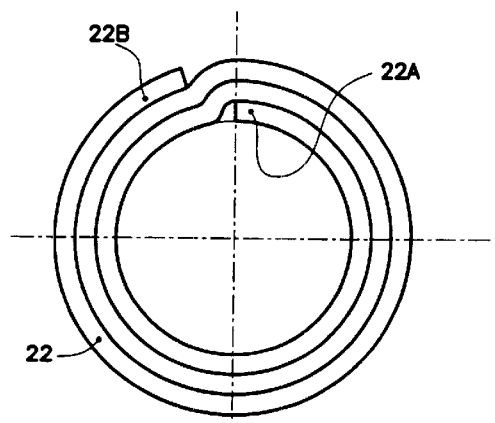
FIG. 15 is a diagram of a strip winding made by the invention.

In FIG. 2, there can be seen a core 30 of substantially toroidal shape, constituting a reference for the manufacture of a tire. This manufacturing technique is known. To extrude rubber, an extruder is used which is mounted on a manipulating robot which permits all the relative positions desired between said receiving surface and the die, the latter being positioned opposite the receiving surface for extruding the tubular form in the vicinity of the receiving surface, the tubular form being flattened on the receiving surface directly after extrusion.

The invention extends to a machine for laying a component comprising uncured rubber for the manufacture of a tire, said machine winding a band on a rotary support, said machine comprising the following elements:

an extruder equipped with a die 1 imparting a tubular form to the section of extruded uncured rubber, a rotary support of revolution, serving as a reference for the manufacture of the tire, a manipulating robot 19 which permits all the desired relative positions between said support of revolution and said die, at least one roller 40 cooperating with the rotary support to flatten the tubular form onto it downstream of said die.

There can be seen a pump 10 for uncured rubber constituting one possible example of an extruder. The pump 10 for uncured rubber is supported by a manipulating robot 19. The rubber pump comprises essentially a filling screw 102, one or more pistons 101 and an extrusion die 1. Starting from a band of rubber 2, the pump enables a strip 22 to be laid on the surface S of the core 30. A roller 40 facilitates laying. The manipulating robot 19 makes it possible to move the extrusion die 1 towards or away from the core 30 along the axis X and to displace it transversely along the axis Y, and also makes it possible to rotate the rubber pump about the axis $\alpha$. The axis $\alpha$ passes substantially through the point at which the strip 22 rejoins the surface S.

The machine is placed under the control of an automatic machine that makes it possible to drive it appropriately. By way of illustration, mention may be made of certain parameters which depend on each other and are controlled by the automatic machine: speed "V" of the screw 102, mechanically linked to the speed of operation of the piston(s) 101, effective laying radius "r" (different according to the zone of the tire—for example bead or tread—or different from one winding to the other in the case of superposition of windings to produce the tread), speed of rotation "N" of the core 30. Here a volumetric extruder is used, the flow rate of uncured rubber extruded being controlled in particular as a function of the speed of rotation of the receiving surface and of the radius of lay of the band.

In FIG. 1, there can be seen in greater detail a first embodiment of a die 1 according to the invention. The latter comprise a pre-die 17 mounted on a rubber pump 10. The roller 40 cooperates with the core 30 downstream of the extrusion orifice, which is located in the plane IV—IV. Uncured rubber 20 is delivered under pressure by the rubber pump 10 and arrives at the die 1. The die 1 comprises a nozzle 11 and an ovoid 12 fastened to the nozzle, and partially blocking off the extrusion orifice so as to provide an air gap 15 between the nozzle and the ovoid, the air gap ending in an extrusion section of appropriate shape.

The rubber is extruded in the form of a tube 21. One part 210 of the tube 21 is close to the receiving surface S and another part is farther away therefrom. The tube 21 is flattened by the action of the roller 40 cooperating with the core 30 to form a strip 22 by gluing the walls of the tube 21.

The ovoid 12 is extended by a tail 18, mounted in an ad hoc bore on the pre-die 17, and held by a nut 180 which prevents expulsion of the ovoid 12 under the effect of the delivery pressure of the rubber. Venting means for the gases enclosed in the tube 21 may possibly be provided. To this end, the tail 18 comprises a pipe 13 that ends in a connector 14 to which an appropriate tube can easily be connected. The pipe 13 passes through the ovoid 12 and opens into the extrusion orifice. The venting may possibly be assisted by a reduced pressure. However, the venting is not indispensable because there is no accumulation of gas during the operation of the invention.

The ovoid 12 advantageously comprises radial wings 121 (see FIG. 3) which center the ovoid 12 within the nozzle 11. In a variant, the position of the ovoid within the nozzle could be adjustable between a centered position and eccentric positions, which may promote non-axisymmetrical extrusion of the tube 21.

It can be seen in FIG. 1 that the ovoid 12 forms with the nozzle 11 a combining cone up to the extrusion orifice. In other words, the air gap 15 is of minimum size at the extrusion orifice (see also 150A in FIG. 6).

The dies proposed by the present invention can be adapted very easily to different sizes of strips that have to be produced. It is not always possible to act on the control of the extrusion in order to move from a small strip to a larger strip. In the variants shown in FIGS. 5 to 9, the extrusion die can very easily be replaced because it is mounted by means of a ring 16 on the pre-die 17 and is accessible from the side of the extrusion orifice. It is very easily possible, by unscrewing the collar 16, to replace the assembly consisting of the nozzle 11 and the ovoid 12A or 12B.

During the extrusion operations for uncured rubber, it is well known that sometimes more solid bodies or rubber bodies which may have undergone initial vulcanization are included. This is why filters are frequently provided upstream of the extrusion orifice. The disadvantage of such filters is that they introduce a high loss of pressure. In the variant embodiment shown in FIGS. 7, 8 and 9, it is proposed advantageously to have the minimum value of the air gap 150B upstream of the extrusion orifice. In this manner, if any solid body were to become stuck at the air gap 150B, the uncured rubber which passes beyond the air gap 150B is able to form a continuous ring again before reaching the extrusion orifice proper. This arrangement acts like a filter, but with a far lower loss of pressure.

It can be seen in detail in FIG. 8 that the ovoid comprises a ring forming a boss 120 upstream of the end which is level with the extrusion orifice. Furthermore, the ovoid 12B comprises, as already indicated, wings 121 which enable it to be centered. The distance between the boss 120 and the extrusion orifice is sufficient for a continuous ring to re-form downstream of any impurity blocked at the air gap 150B, which can be determined experimentally if needed.

Among the advantages of the invention, we may mention that this extrusion technique does not have an edge effect. The strips thus produced are less susceptible to the tearing which often begins at one edge. This is very particularly advantageous for certain rubber mixes. Furthermore, owing to the use of the invention, a good quality of the state of the inner and outer surface of the tube 21 is maintained, which is a guarantee of good adhesive power in the uncured state of the strip then formed by flattening.

FIGS. 10 and 11 illustrate in greater detail a rolling operation which can be effected downstream of the extrusion orifice proper. There can be seen the core 30 and the receiving surface S. There can also be seen the die 1, comprising a nozzle 11 within which there is mounted an ovoid 12. A roller 40 is mounted on a fork 45 which itself is supported by an arm 46 articulated to a support 44. The support 44 is integral with the rubber pump 10. A spring 42 acts between the support 44 and the roller 40. The roller 40 thus exerts a controlled pressure towards the core 30. There can also be seen two auxiliary rollers 41 each mounted on a side plate 48. Each of the side plates 48 is mounted on an arm 47, which is articulated to the support 44. Springs 43 act between each of the arms 47 and the support 44, for a function comparable to that of the spring 42.

It is in fact advantageous to have good rolling, effected here by three independent rollers, namely the roller 40 and auxiliary rollers 41, applying substantially radial forces, of a well-controlled intensity which is chosen by experiment, and is possibly adjustable. It is advantageous to have springs of great flexibility in order to exert a rolling stress which is substantially constant, even in the case of an eccentricity or a local imperfection in the laying of the rubber. The roller 40 effects a first squashing of the tube 21 which has just been extruded by the die 1, which positions the median part of the strip 22 on and adheres it to the receiving surface S. The auxiliary rollers 41 flatten the edges of the strip 22 on to the receiving surface S.

FIGS. 12 and 13 enable one advantage of the invention to be understood. For different reasons, among which we may mention the great accuracy of laying of the rubber, it is desirable for the head of the rubber pump 10 to be positioned as close as possible to the point at which it is desired to lay the rubber on the tire blank being manufactured. However, the extruders used for laying strips of rubber are relatively voluminous. As the section conventionally extruded is rectangular, in conventional devices, the die which makes it possible to profile the tire strip has a bulk which is necessarily greater than the section of the strip of rubber which it is desired to lay.

The invention therefore proposes an extrusion die which is narrower than the strip to be extruded. Referring to FIGS. 12 and 13, it can be seen that there is a change from a tube 21 of a given diameter "d" to a strip 22, the width "L" of which is greater than the diameter of the tube 21, and is substantially comparable to the bulk "E" of the die 1.

Furthermore, it is desirable for the pattern of laying of the strips to respect as far as possible the molding shape of the tire. For example, for some treads, it is desired for the overall section of uncured rubber to approach as closely as possible the final tread pattern of the tire, to avoid or restrict the movements of rubber during molding. One is thus led, for example, to lay stacks of bands to form circumferential ribs separated by small grooves. The problem which arises is that the head of the rubber pump 10, that is to say the die which profiles the rubber, by reason of its bulk, may strike the uncured rubber which has been laid to form the circumferentially adjacent rib.

FIG. 12 is a view in the direction of the arrows AA in FIG. 10, the roller 40 not being shown. There can be seen the nozzle 11 by means of which a tube of uncured rubber is extruded. The tube 21 is transformed into a strip 22 by flattening. As has already been emphasized, the strip 22 is of a width "L" greater than the diameter "d" of the tube 21. Owing to the invention, it can be seen that it is possible to lay, on a tire blank 50 which is being manufactured, strips 22 to form by superposition rubber ribs 51 without being hindered by the stacks produced at an offset transverse position. FIG. 13 is a view in the direction of the arrows BB in FIG. 10. It makes it possible to understand that even the rolling device with three rollers 40 and 41 proposed by the invention is of a bulk close to the width of the strip 22. The rolling carriage (bearing the rollers 40 and 41) easily penetrates between the cords of uncured rubber.

Other applications of the invention are possible. It is possible to conceive of injecting another product such as, for example, a vulcanization system, or reinforcement fibers into the volume enclosed in the tube 21.

FIG. 14 illustrates an application of the invention to the addition of a constituent into the tube 21, so as to finish off the vulcanizable rubber composition. This may be, for example, the vulcanization system and/or any appropriate additive. It is known that some constituents may migrate into the uncured rubber, so that such an addition is not incompatible with good homogeneity. This addition is made at the time of laying of the strip 22, in a process of laying a component comprising uncured rubber during the manufacture of a tire, the laying being effected by winding a band on to a rotary support having a receiving surface S, the band being manufactured as indicated above. However, it is possible to conceive of making a semi-finished product in this manner.

It can be seen that the die 1B comprises a nozzle 1B and an ovoid 12B. The ovoid 122B comprises a pipe 133B which passes through the ovoid 122B and opens into the extrusion orifice. Appropriate means make it possible to introduce a material 23 into the tube 21. A certain quantity of material 23 is thus added continuously to the uncured rubber at the same time as a strip 22 is formed and is applied to the manufacturing support 30. The automatic machine for controlling the machine according to the invention of course ensures that a controlled proportion is maintained between the material 23 and the extruded rubber 20. These proportions are not necessarily constant. The metering of the material 23 may be variable, the proportion being adjusted as a function of the location where the strip 22 is laid in the tire.

Figure 16:
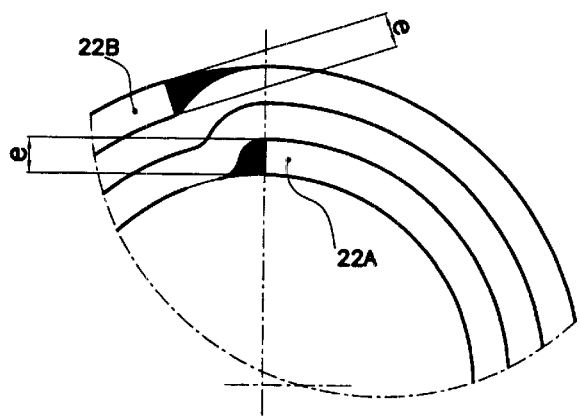
FIG. 16 is an enlargement of part of FIG. 15.

FIGS. 15 and 16 illustrate the result obtained when three complete turns of a strip 22 wound on a support of revolution such as a rotary core acting as a manufacturing reference for a tire are superposed. A lack of homogeneity (all the greater, the greater the thickness "e" of the strip) is noted at the azimuth of laying of the start 22A of the strip, which it is quite difficult to mask even by correctly positioning the azimuth of the end 22B of the strip.

In order to overcome this difficulty, it is desirable to be able to effect starting and ending of laying at a variable strip thickness. FIGS. 17 to 20 illustrate another variant of the invention which makes it possible to achieve precisely that. To this end, the thickness of said wall of the rubber tube is varied to obtain a variation in thickness of the strip.

It can be seen in FIG. 17 that the ovoid 12B is extended by a tail 18B, mounted in an ad hoc bore on the pre-die 17. The tail 18B penetrates into a cylinder 182B and ends in a disc 181B forming a piston which slides in said cylinder 182B. A device for controlling the displacement 183B makes it possible to act on the relative position of the tail 18B relative to the pre-die 17, for example by injecting or withdrawing a given quantity of oil into/from the chamber 184B. Thus, the position of the ovoid 12B within the nozzle 11 (FIG. 18) is adjustable in a direction parallel to the flow of uncured rubber in the air gap. Furthermore, just upstream of the extrusion orifice, the nozzle 11 and the ovoid 12B have a frustoconical surface. In this manner, by acting on the relative position of the ovoid 12B in the nozzle 11, the thickness of the air gap and, consequently, the thickness of the extruded tube of rubber is varied.

FIG. 18 shows the extrusion of a tube, the walls of which are of a thickness such that, once flattened against the support S, a strip of thickness "e2" is obtained for the position of the ovoid 12B illustrated in FIGS. 17 and 18. In FIGS. 19 and 20, there can be seen another position of the ovoid 12B, further to the inside of the nozzle 11. In the configuration of these elements as illustrated, the air gap is smaller. Once the tube is flattened against the support S, a strip of lesser thickness "e1" is obtained. Note that the width of the extruded strip, which depends mainly on the diameter "d" of the tube, is substantially independent of the thickness.

Figure 21:
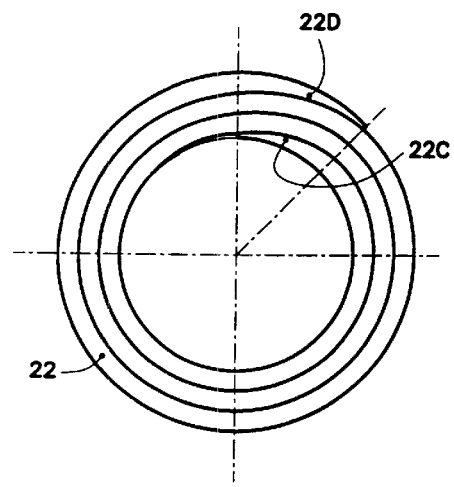
FIG. 21 is a diagram of a strip winding made by said other variant of the invention.
Figure 22:
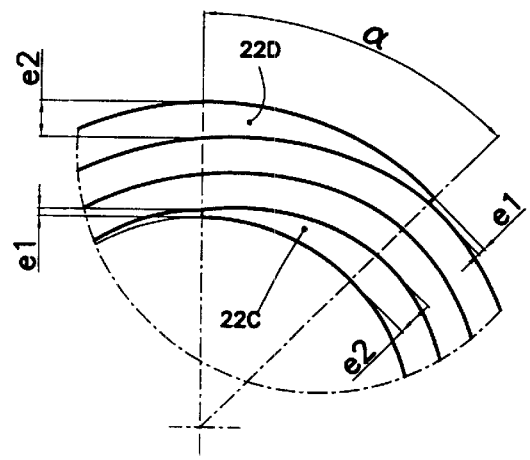
FIG. 22 is an enlargement of part of FIG. 21.

By gradually varying said thickness, of course in synchronization with the volume extruded and the rotation of the support S, it is possible to obtain a start 22C and an end 22D of the strip which extends over an arc α of greater or lesser size, as illustrated in FIGS. 21 and 22.

The invention has been illustrated for operations of laying the strip in a spiral. The invention is also useful for laying strip in a helix, and more generally for any form of laying of a rubber product by direct extrusion on a support in the manufacture of tires.

We claim:

1. A process for laying a component comprising uncured rubber during the manufacture of a tire, the laying being effected by winding a band on to a rotary support having a receiving surface, comprising:

extruding uncured rubber through a die imparting a tubular section to the extruded uncured rubber to form a rubber tube, the wall of which defines an internal cavity, and flattening the tubular form to form a band which is adhered to said receiving surface, wherein the die is positioned opposite the receiving surface so that the tubular form is extruded in the vicinity of the receiving surface, the tubular form being flattened on the receiving surface directly after extrusion.

2. A process according to claim 1, using to extrude said uncured rubber an extruder which is mounted on a manipulating robot which permits all the relative positions desired between said receiving surface and the die.

3. A process according to claim 2, wherein the extruder is a volumetric extruder, the flow rate of uncured rubber extruded being controlled as a function of the speed of rotation of the receiving surface and of the radius of lay of the band.

4. A process according to claim 1, in which gases included in the tube are evacuated by venting means.

5. A process according to claim 1, in which the thickness of said wall of the rubber tube is varied along the length of the tube.

6. A process for laying a component comprising uncured rubber during the manufacture of a tire, the laying being effected by winding a band on to a rotary support having a receiving surface, comprising:

extruding uncured rubber through a die imparting a tubular section to the extruded uncured rubber to form a rubber tube, the wall of which defines an internal cavity, concomitantly with the extrusion, introducing a material into said tube in a predefined amount, and flattening the tubular form to form a band which is adhered to said receiving surface, wherein the die is positioned opposite the receiving surface so that the tubular form is extruded in the vicinity of the receiving surface, the tubular form being flattened on the receiving surface directly after extrusion.

7. A process according to claim 6, in which the material introduced is metered variably as a function of the location of laying in the tire.

8. A process according to claim 6, using to extrude said uncured rubber an extruder which is mounted on a manipulating robot which permits all the relative positions desired between said receiving surface and the die.

9. A process according to claim 8, wherein the extruder is a volumetric extruder, controlling the flow rate of uncured rubber extruded as a function of the speed of rotation of the receiving surface and of the radius of lay of the band.

10. A process according to claim 6, in which the thickness of said wall of the rubber tube is varied along the length of the tube.

* * * * *

UNITED STATES PATENT AND TRADEMARK OFFICE
CERTIFICATE OF CORRECTION

PATENT NO. : 6,666,940 B2
DATED : December 23, 2003
INVENTOR(S) : T.G. Nagaraja et al.

It is certified that error appears in the above-identified patent and that said Letters Patent is hereby corrected as shown below:

<u>Title page,</u>
Item [73], Assignee, "Kansas University Research Foundation" should read
-- Kansas State University Research Foundation --

Signed and Sealed this

Sixth Day of April, 2004

JON W. DUDAS
*Acting Director of the United States Patent and Trademark Office*